United States Patent [19]
Heiskell et al.

[11] Patent Number: 5,409,368
[45] Date of Patent: Apr. 25, 1995

[54] APPARATUS FOR PUNCHING

[76] Inventors: Ronald E. Heiskell, 51 Wimbledon La., Tracy, Calif. 95376; Ezra E. Theys, 3706 Kenwood Ave., San Mateo, Calif. 94403; Karl Krause, 9631 E. Highway 26, Mokelellume, Calif. 95245; Frank Knafelc, 3148 Padre, Lafayette, Calif. 94549

[21] Appl. No.: 69,620

[22] Filed: Jun. 1, 1993

[51] Int. Cl.⁶ .................. B29C 43/50; B29C 51/44; B65G 65/08
[52] U.S. Cl. .................. 425/301; 264/153; 264/156; 271/18.3; 271/84; 414/417; 425/307; 425/316; 425/403.1; 425/436 R
[58] Field of Search .............. 425/403.1, 315, 316, 425/436 R, 436 RM, DIG. 48, 301, 307; 264/153, 154, 155, 156, 161, 160; 294/61; 53/520, 559, 373.4; 226/74; 414/412, 417; 271/18.3, 84, 278

[56] References Cited

U.S. PATENT DOCUMENTS

| | | | |
|---|---|---|---|
| 1,763,735 | 6/1930 | Wydom | 226/74 |
| 1,879,555 | 9/1932 | Simmons | 264/153 |
| 2,953,814 | 9/1960 | Mumford | 264/153 |
| 3,240,851 | 3/1966 | Scalora | 264/153 |
| 3,472,723 | 10/1969 | Lemelson | 156/500 |
| 3,685,251 | 8/1972 | Mahaffy et al. | 53/373.4 |
| 3,808,772 | 5/1974 | Turtschan | 53/141 |
| 3,874,143 | 4/1975 | Braber | 53/412 |
| 4,015,872 | 4/1977 | Loznak et al. | 294/61 |
| 4,124,242 | 11/1978 | Canner | 425/403.1 |
| 4,214,741 | 7/1980 | Crawford | 294/61 |
| 4,440,702 | 4/1984 | Susnjara | 425/403.1 |
| 4,636,348 | 1/1987 | Whiteside | 264/544 |
| 4,688,837 | 8/1987 | Ball et al. | 294/61 |
| 4,704,844 | 11/1987 | Mancini | 53/453 |
| 4,778,551 | 10/1988 | Coffman | 156/224 |
| 4,823,506 | 4/1989 | Demarest et al. | 43/131 |
| 4,841,669 | 6/1989 | Demarest et al. | 43/131 |
| 4,946,551 | 8/1990 | Ishige et al. | 294/61 |
| 5,022,336 | 6/1991 | Iwase | 226/74 |
| 5,192,484 | 3/1993 | Matuzawa et al. | 264/555 |

FOREIGN PATENT DOCUMENTS 1031868  7/1983  U.S.S.R. .................. 294/61

*Primary Examiner*—Jay H. Woo
*Assistant Examiner*—Joseph Leyson

[57] ABSTRACT

In an apparatus for detaching an article from a member attached thereto, the attached article and member are supported on a grid such that the member is in contact with a substantially rigid surface of the grid and the article is suspended away from the rigid surface. Holders hold the member to the rigid surface. While the member is held to the rigid surface, a punch detaches the article and the member. The member from which the article has been detached is gripped by a pin assembly and the gripped member is removed from the substantially rigid surface by raising the pin assembly.

12 Claims, 16 Drawing Sheets

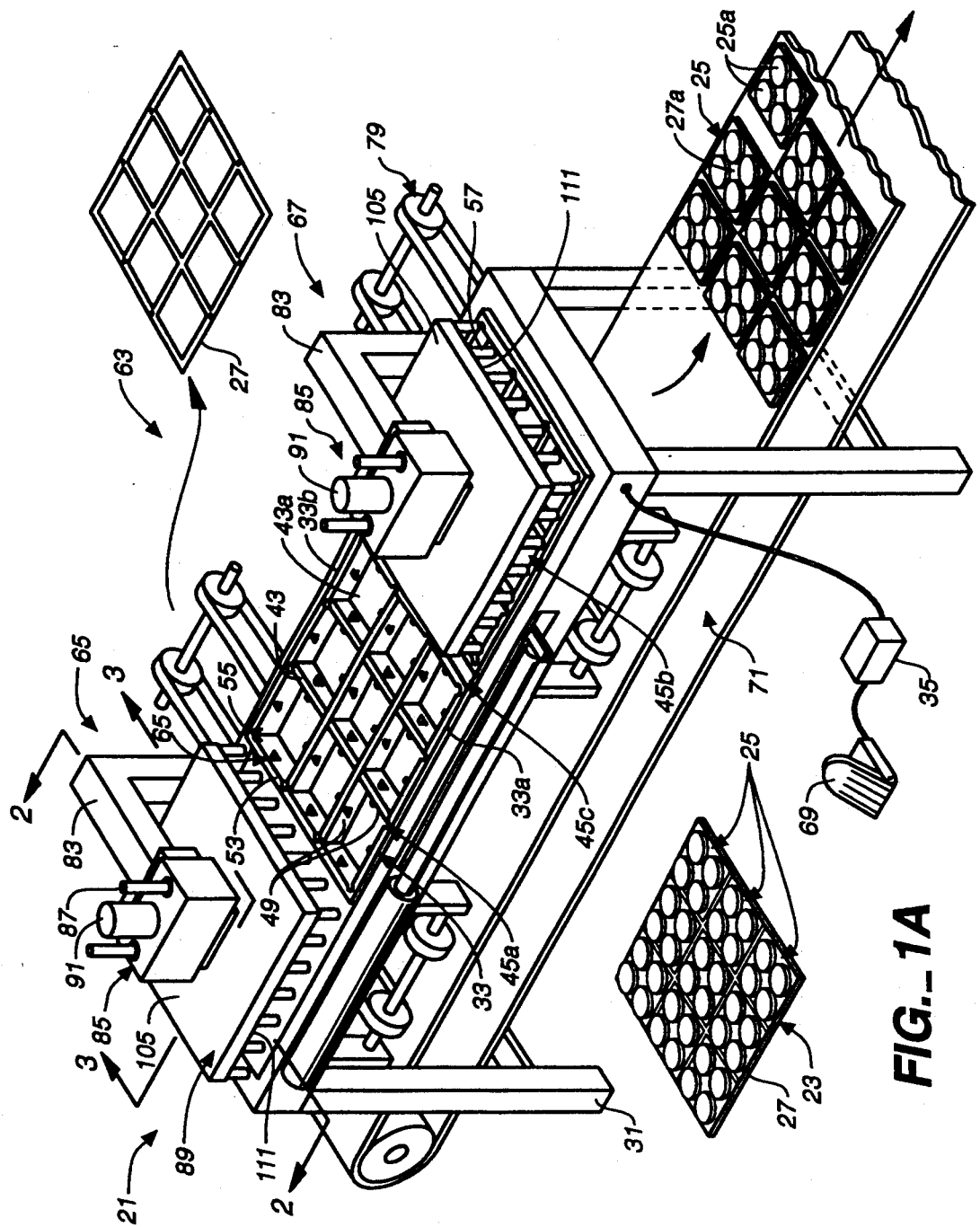
FIG._1A

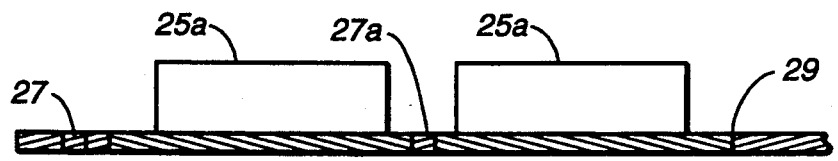
FIG._1C
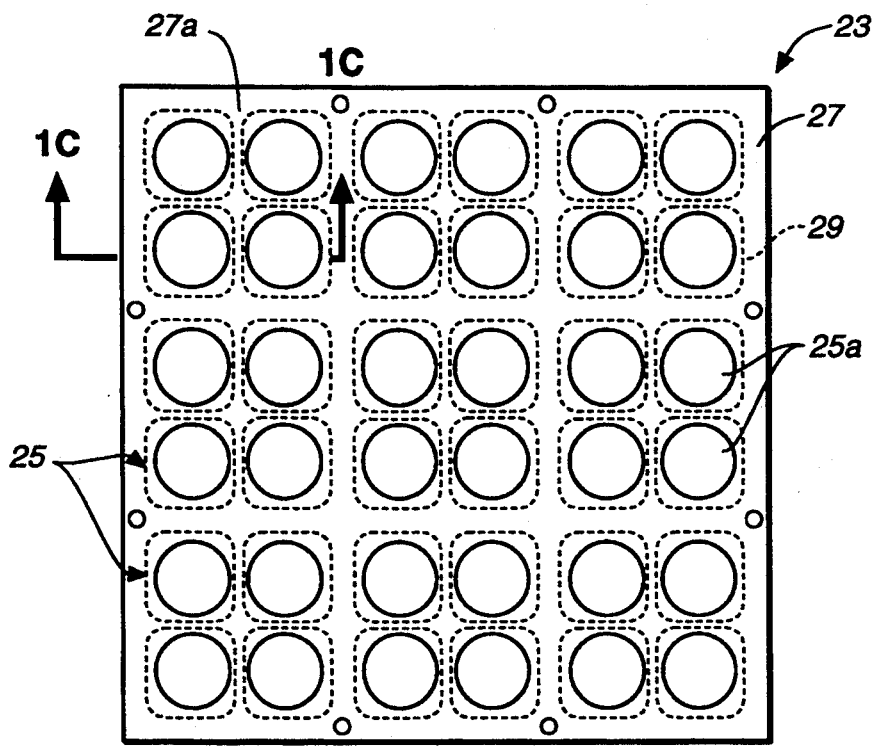
FIG._1B
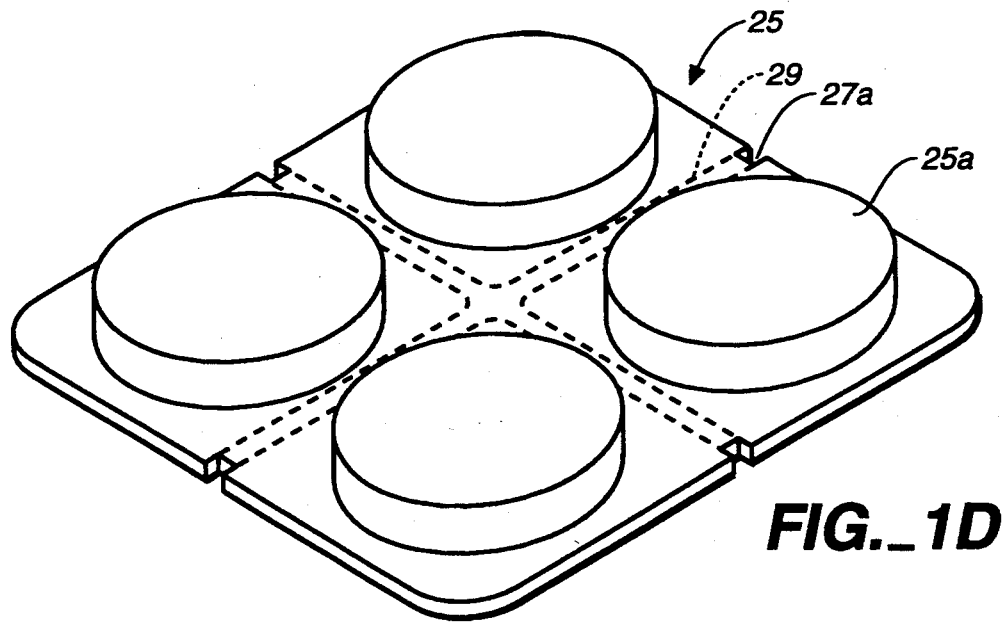
FIG._1D

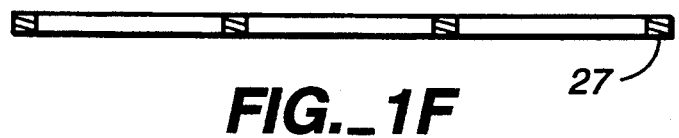
FIG._1F
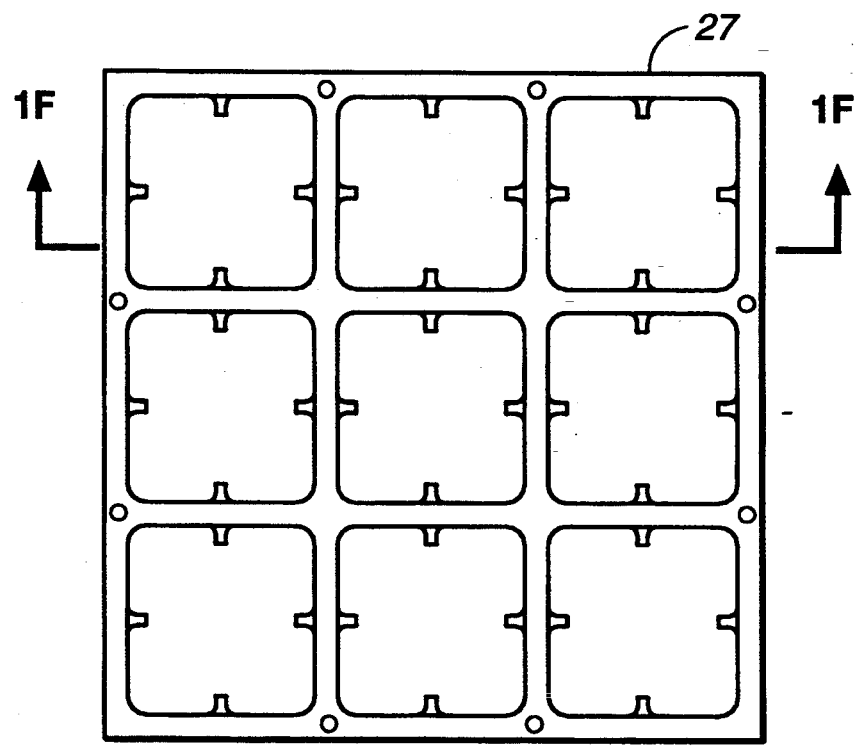
FIG._1E

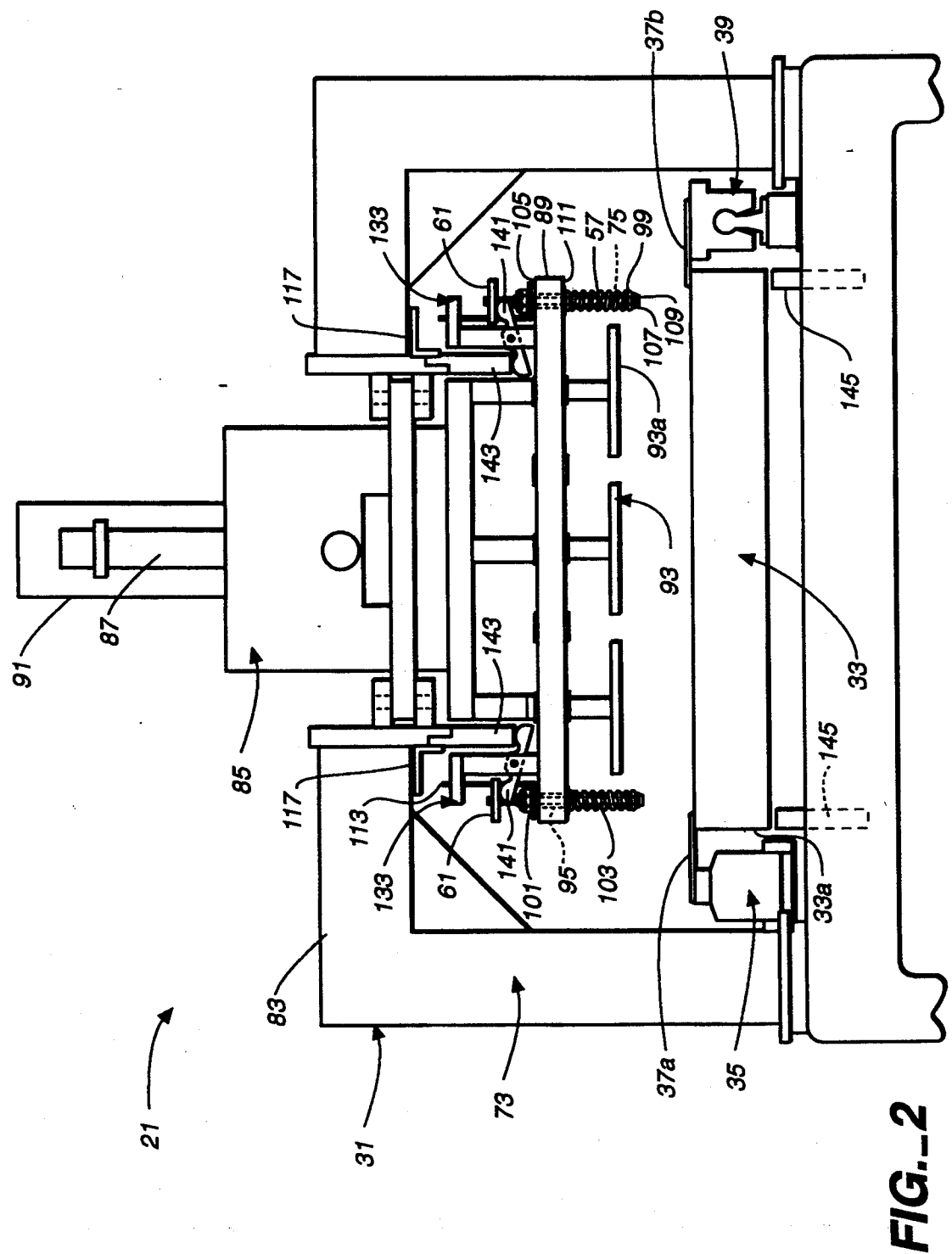

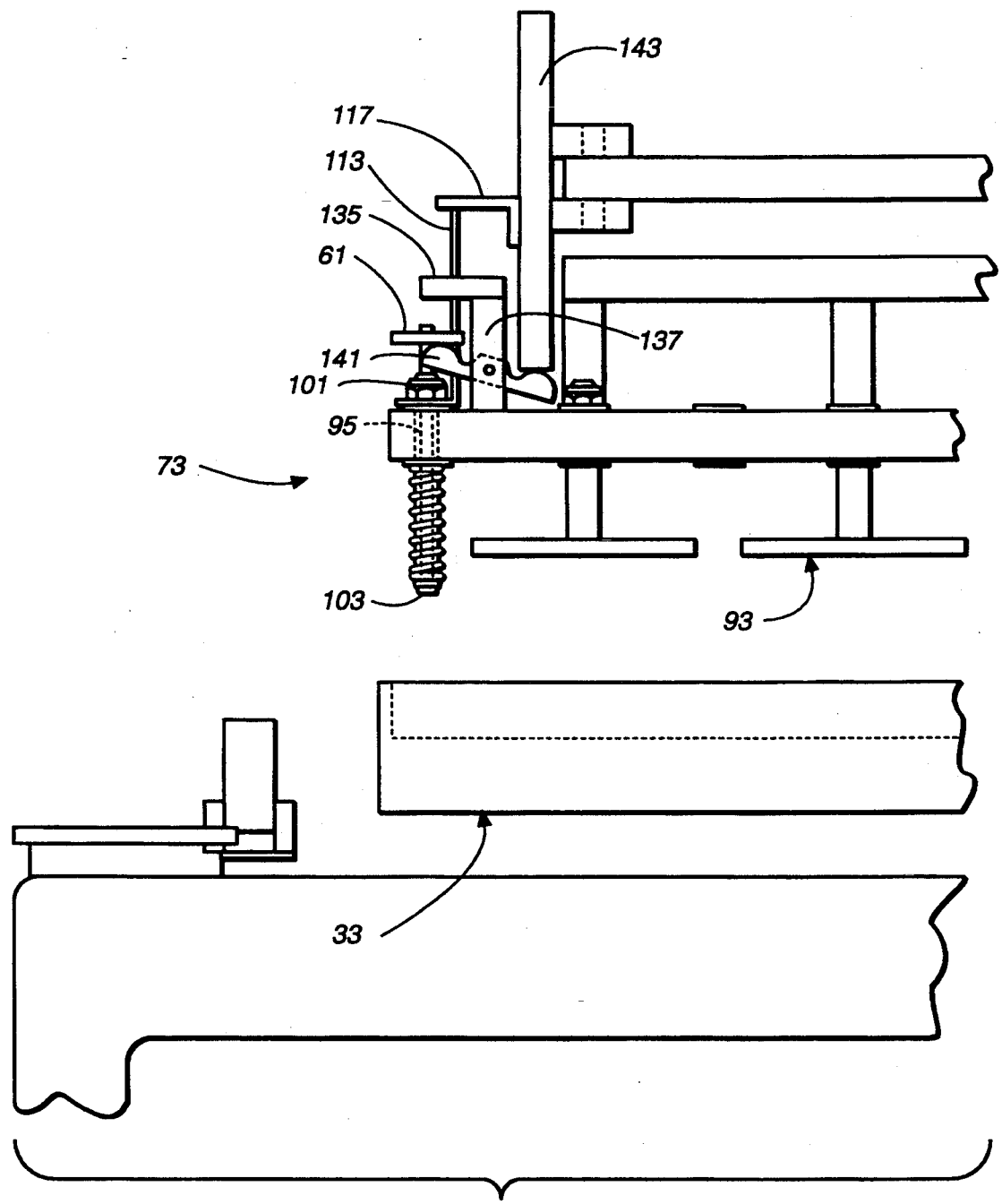
FIG._3

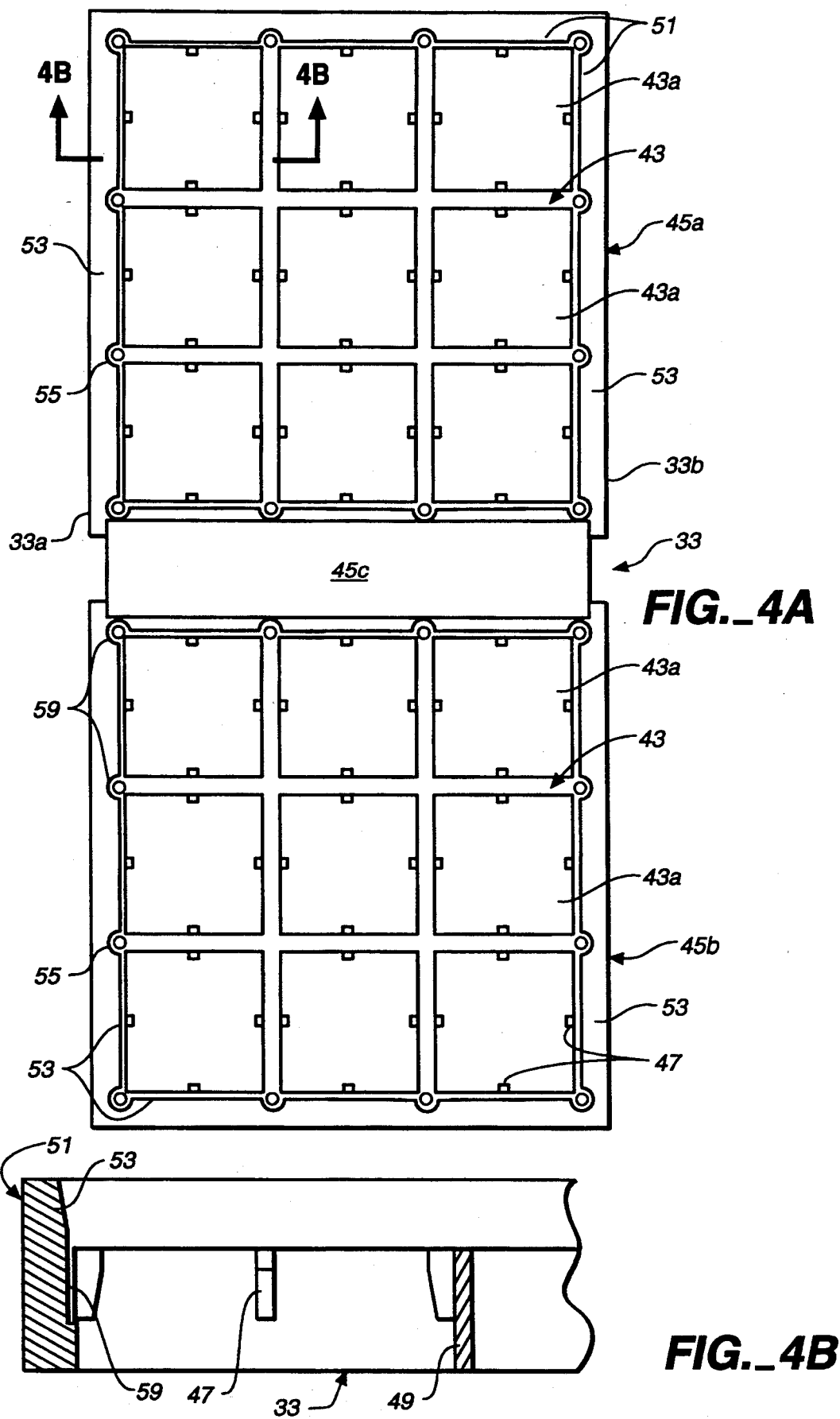
FIG._4A
FIG._4B

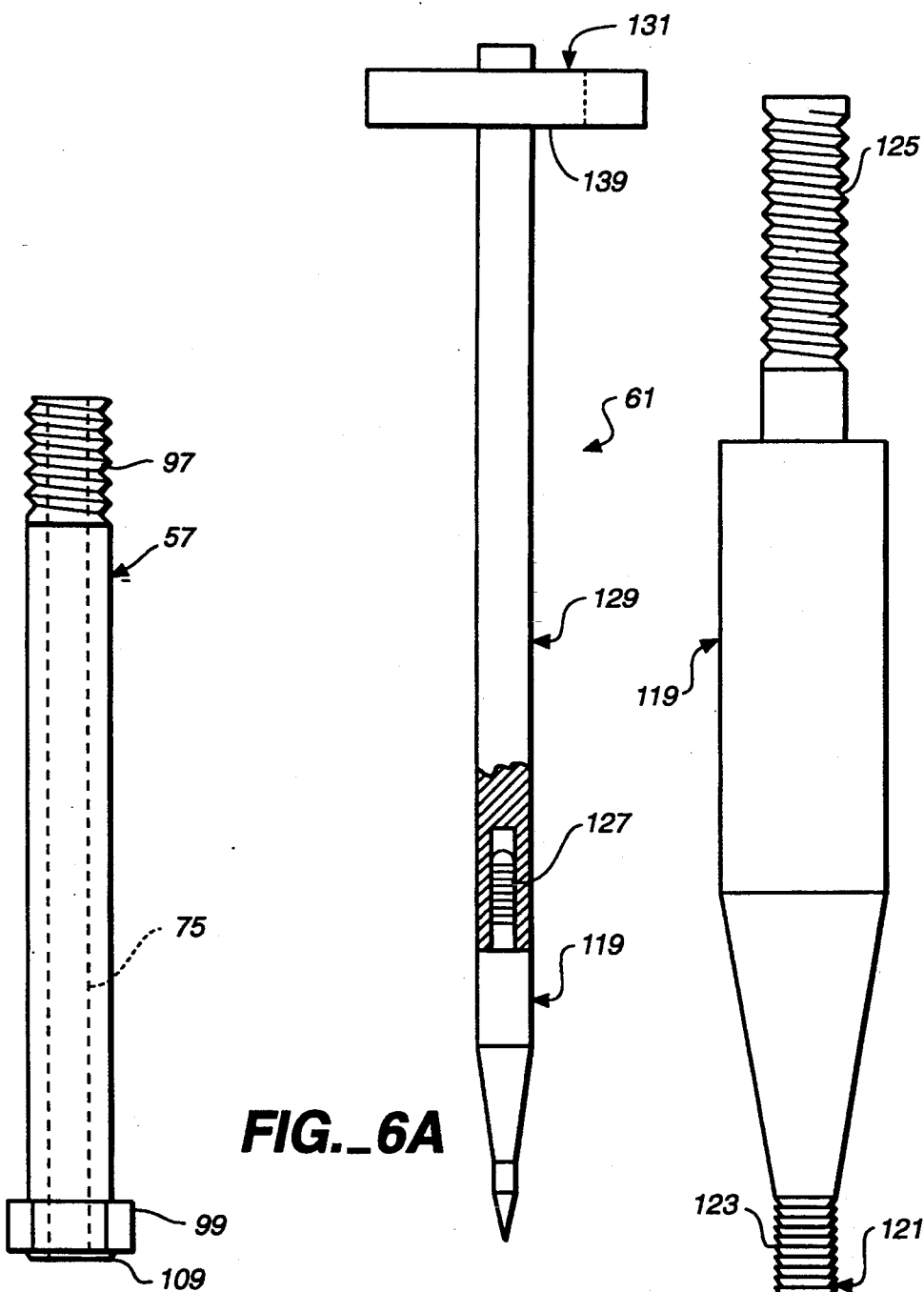
FIG._5A
FIG._6A
FIG._7
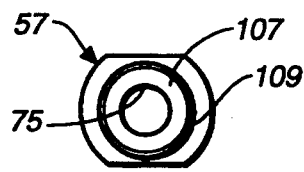
FIG._5B
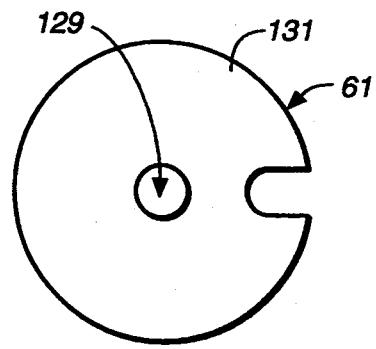
FIG._6B

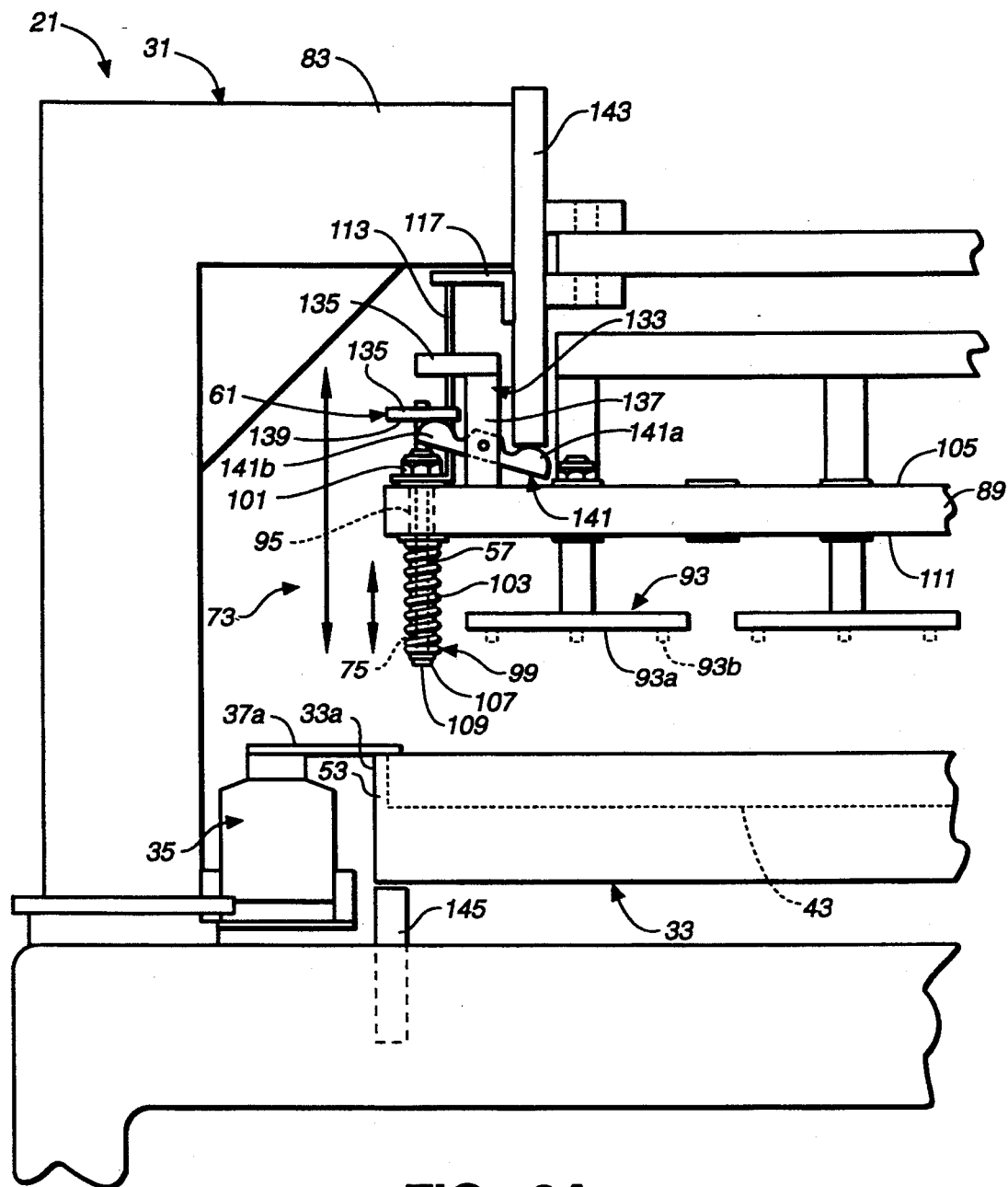
FIG._8A

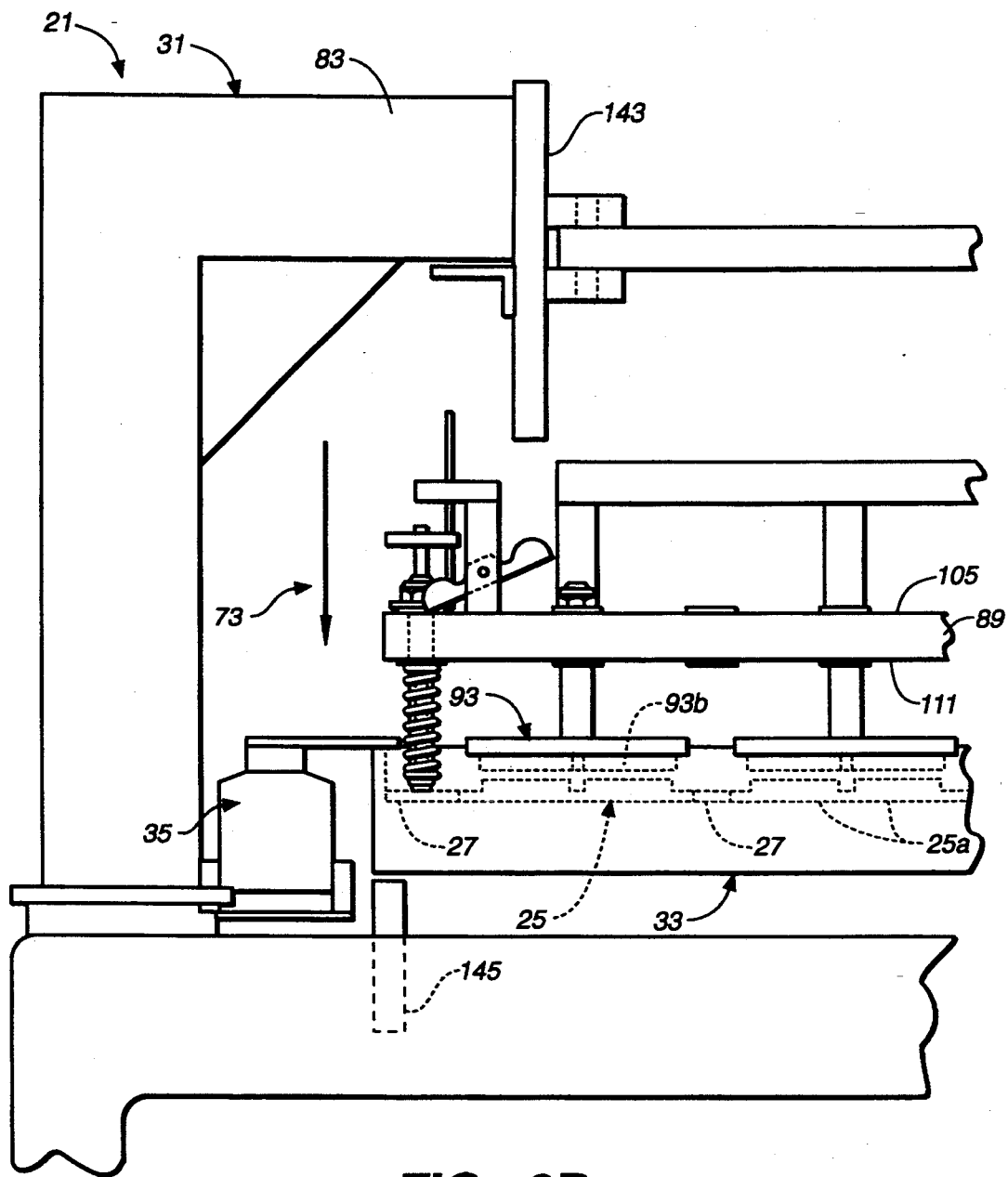
FIG._8B

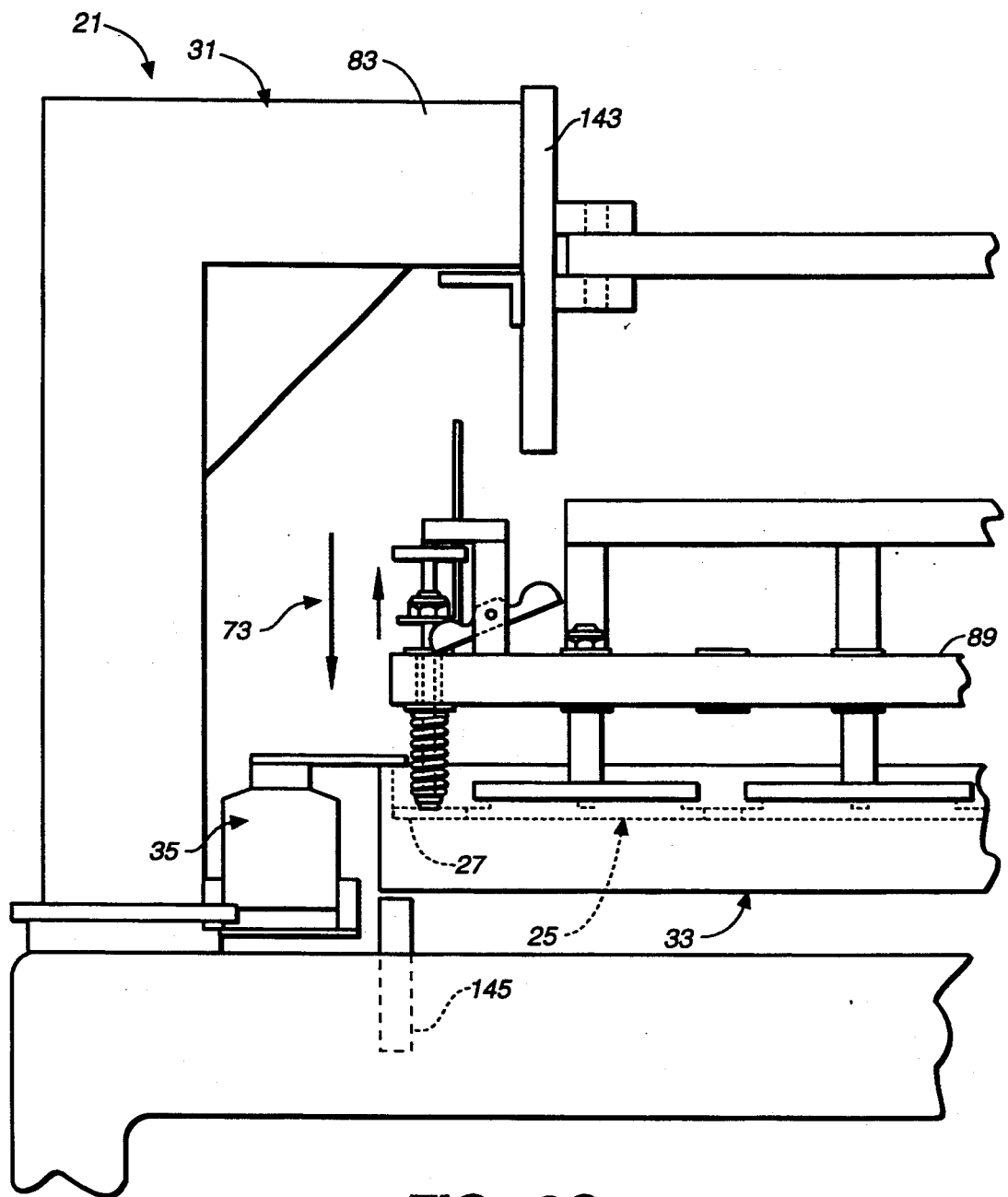
FIG._8C

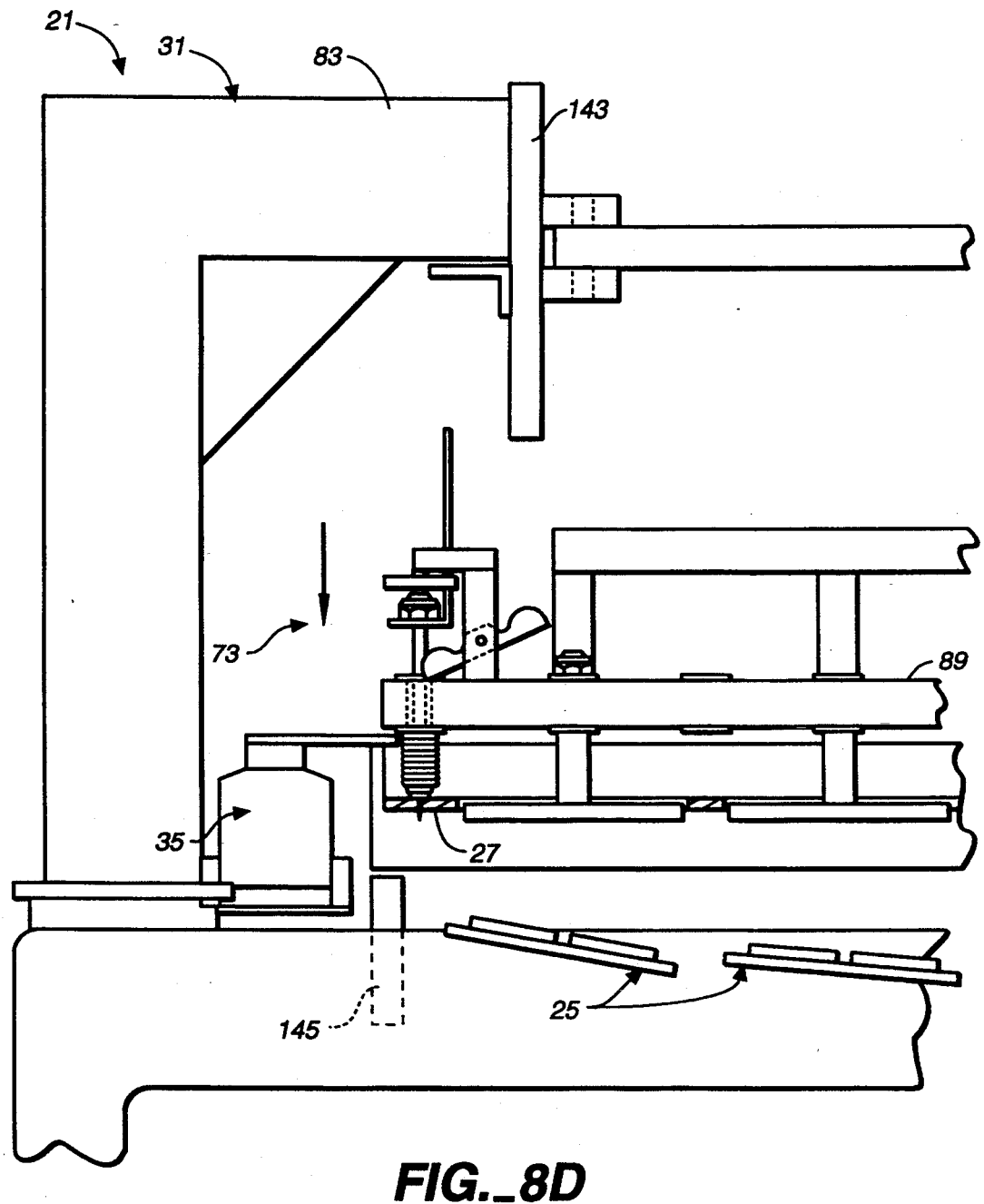
FIG._8D

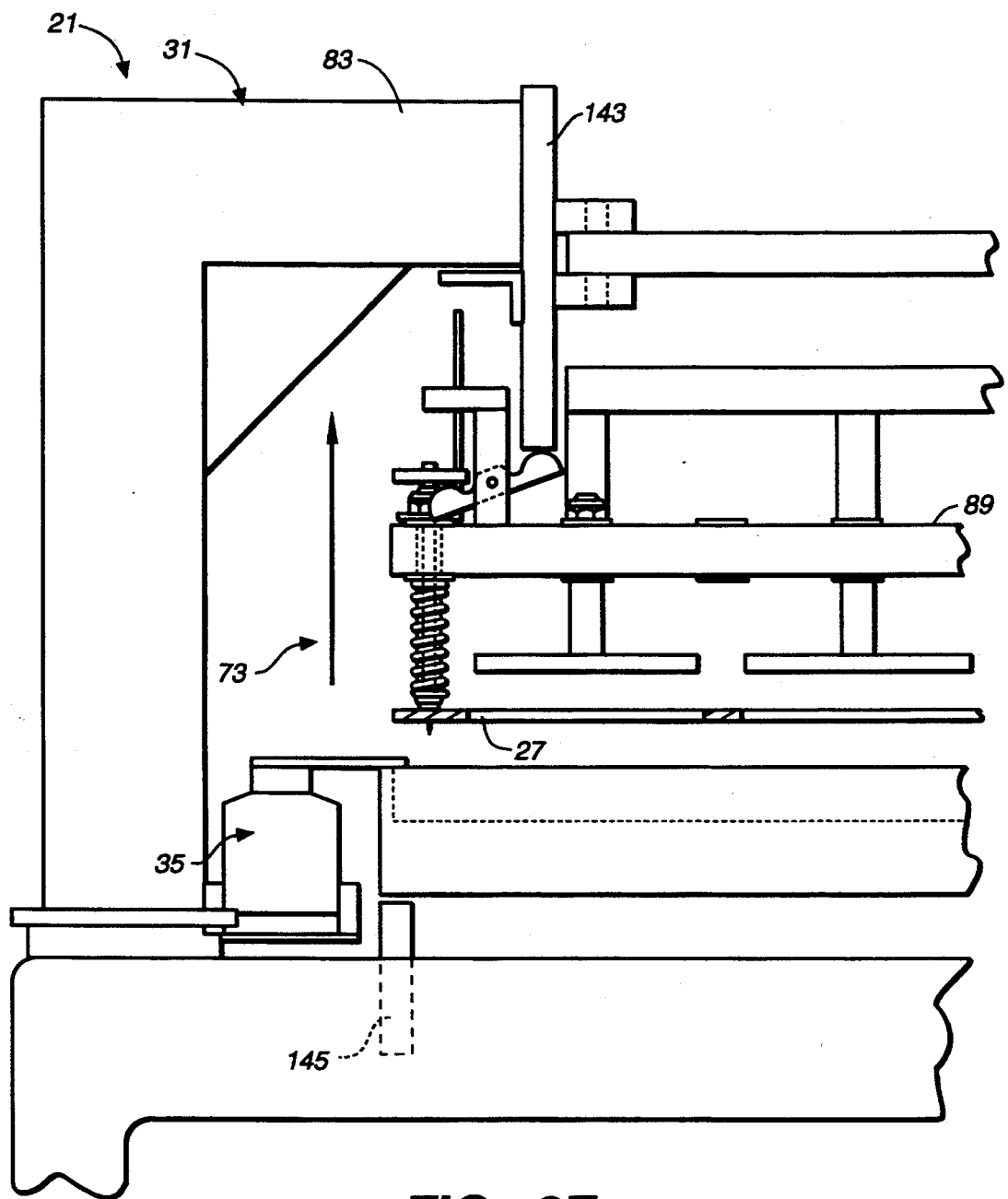
FIG._8E

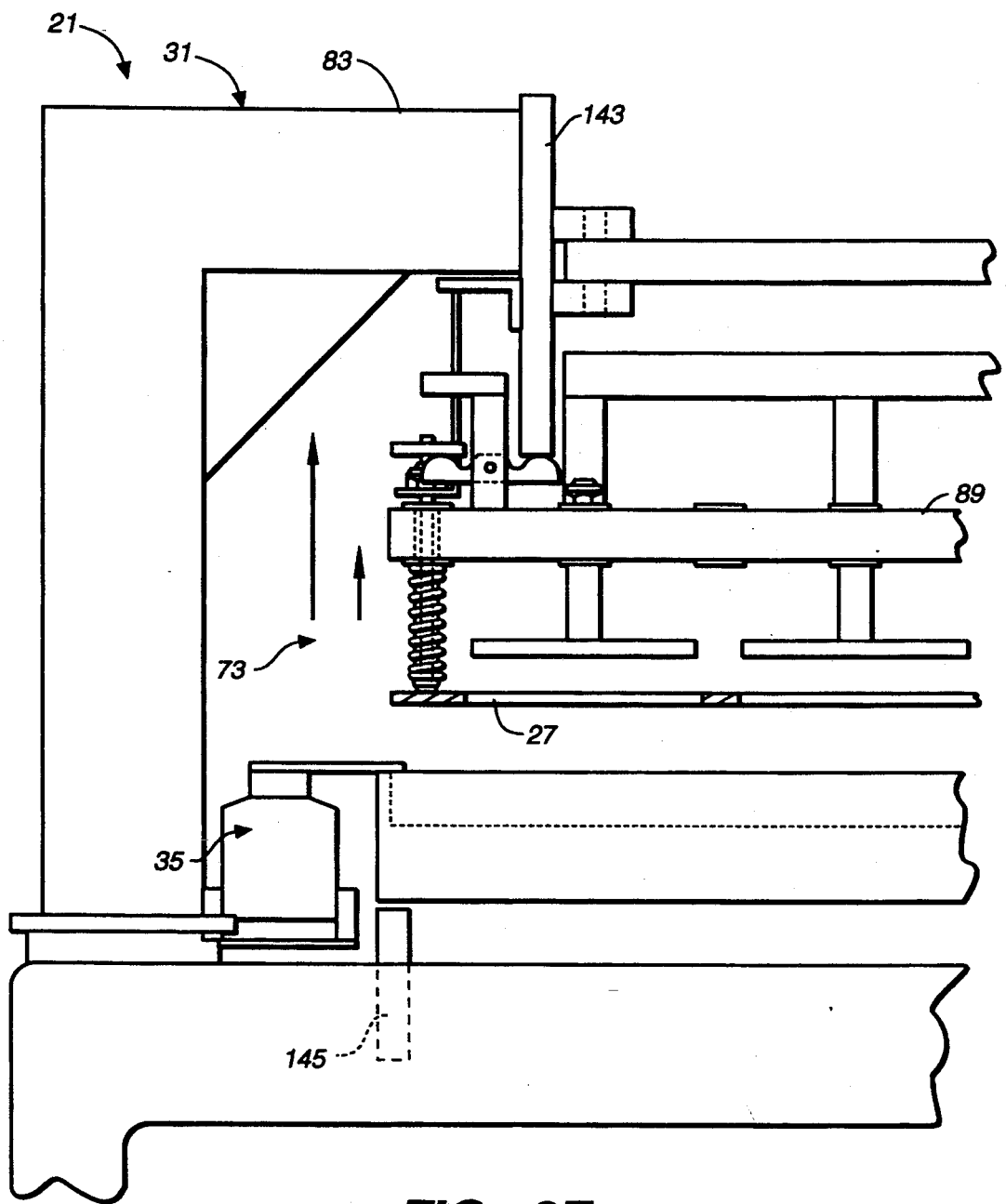
FIG._8F

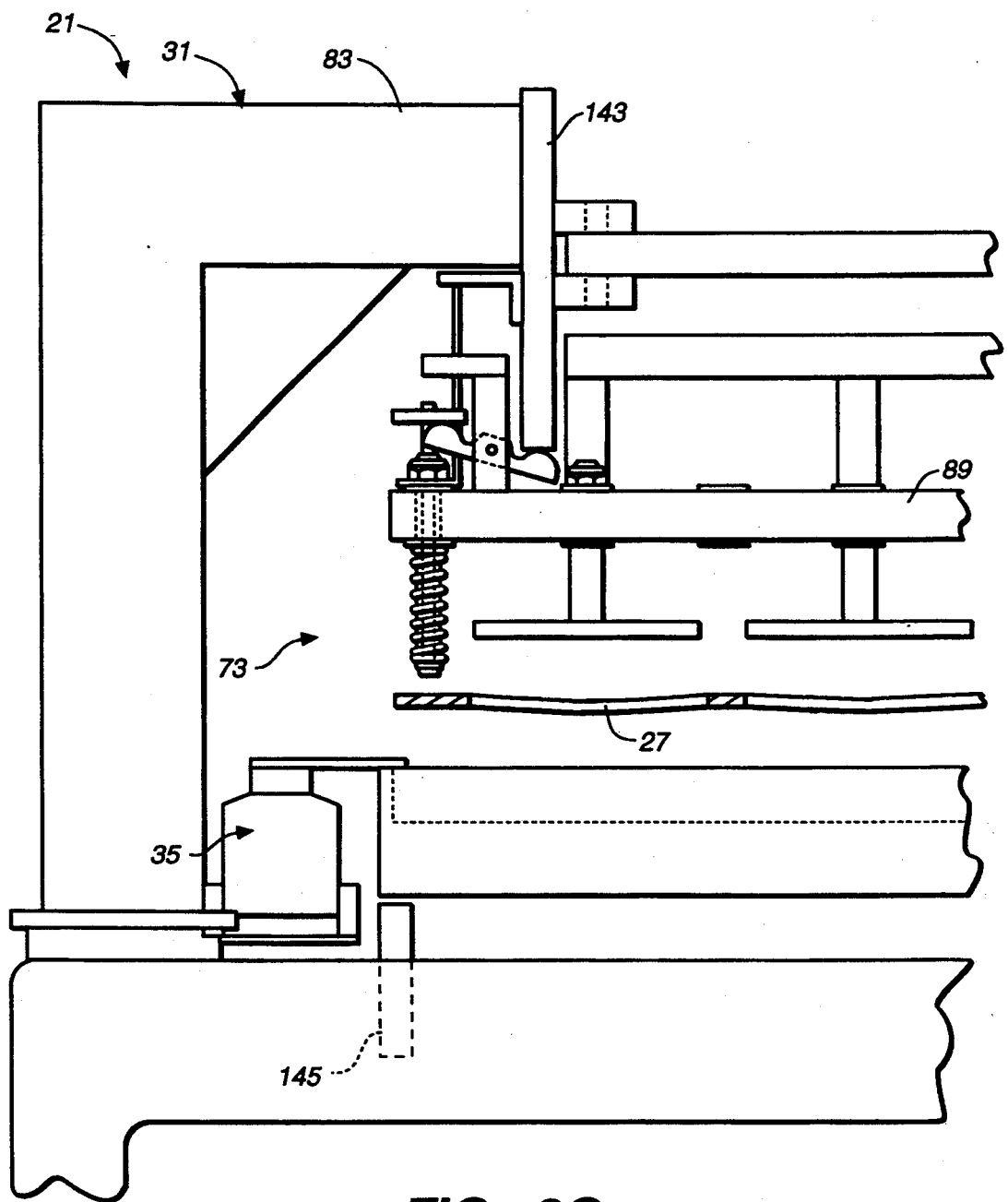
FIG._8G

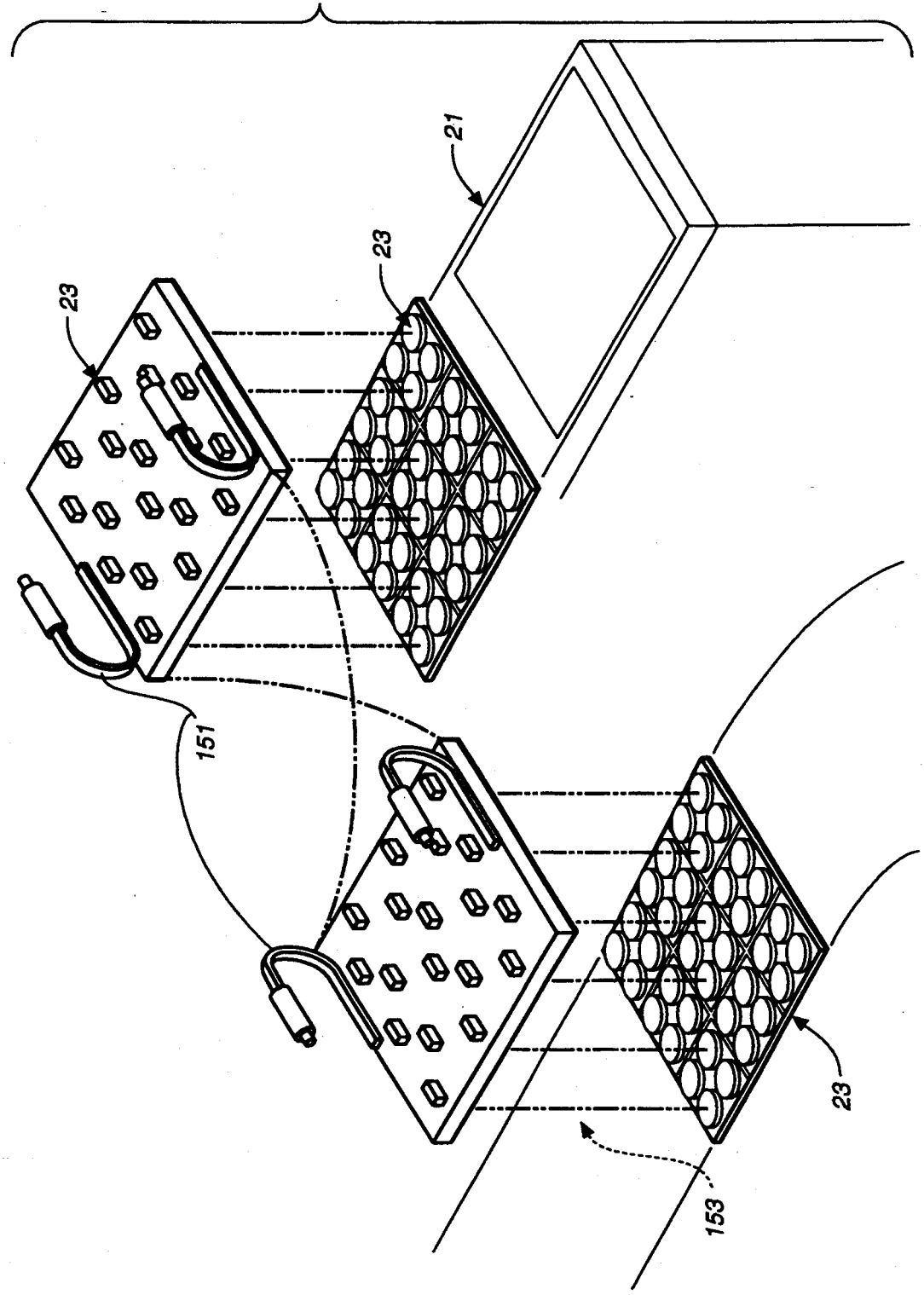

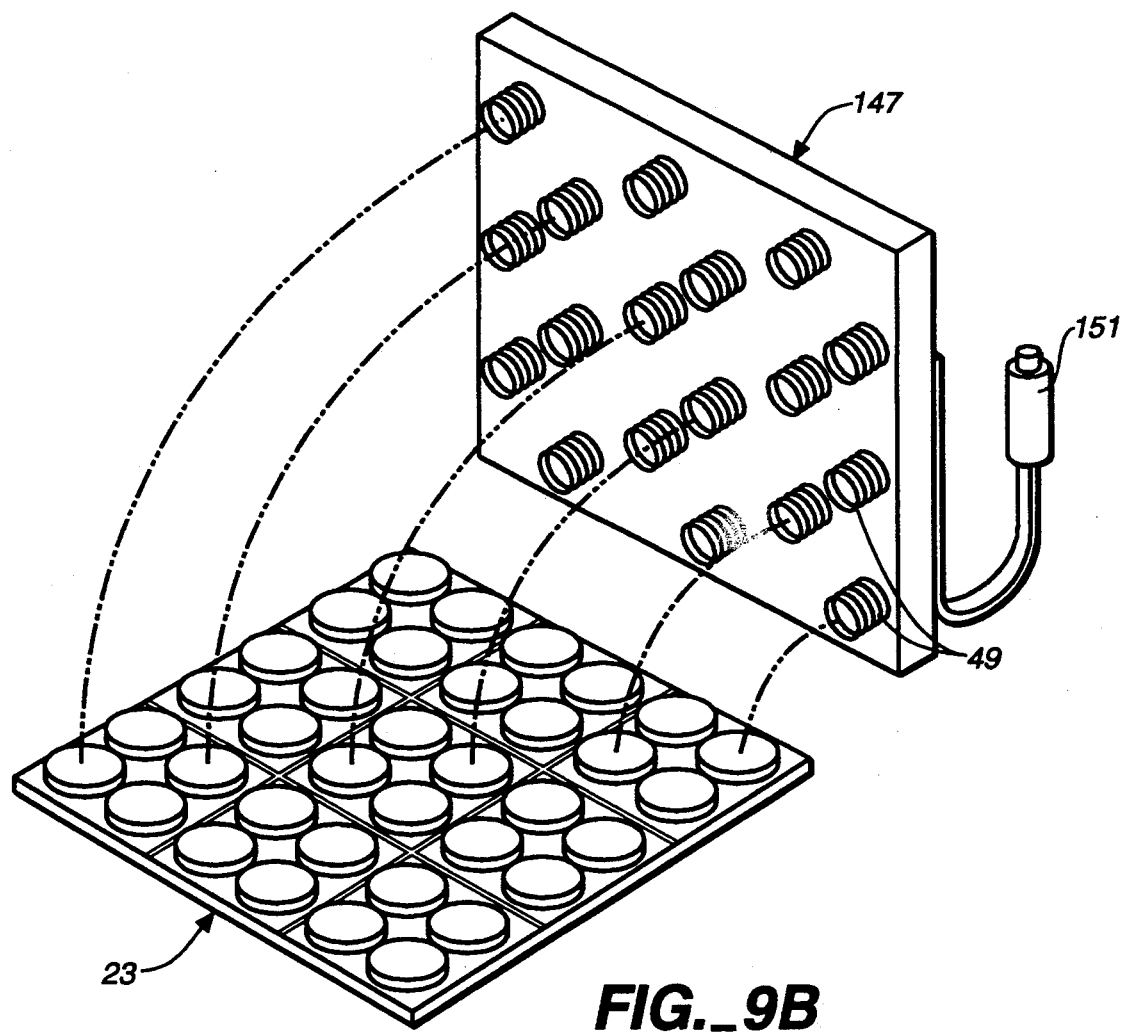
FIG._9B

APPARATUS FOR PUNCHING

BACKGROUND OF THE INVENTION

1. Filed of the Invention

The present invention relates to a method and apparatus for detaching an article from an attached member.

2. State of the Art

In various manufacturing operations, especially ones using thermoplastic materials, it is necessary to separate an article from a member to which it is attached. For example, portions of articles may be attached to a thermoplastic web base having perforations that allow easy separation of the articles from the thermoplastic web. In practice, the process of separating articles from one another and from the web is performed manually, usually by shaking apart the articles.

SUMMARY OF THE INVENTION

The present invention, generally speaking, provides apparatus and a method for detaching articles from attached members which, in comparison to prior processes, is less labor-intensive and maintains a high degree of integrity of the manufactured articles.

In accordance with one aspect of the present invention, a method for detaching an article from a member attached thereto is provided. In the method, the attached article and member are supported such that the member is in contact with a substantially rigid surface and the article is suspended away from the rigid surface. The member is held to the rigid surface. The article is contacted, while the member is held to the rigid surface, to detach the article and the member. The member is gripped and the gripped member is removed from the substantially rigid surface.

In accordance with another aspect of the present invention, a method for detaching articles from attached members includes a step of loading a first blank including an article and an attached member onto a first portion of a frame at a loading station. The first portion of the frame is moved beneath a first assembly. A second blank is loaded onto a second portion of the frame at the loading station. The article and member of the first blank are detached with the first assembly. The frame is moved so that the second portion of the frame is beneath a second assembly and the first portion of the frame is at the loading station.

In accordance with a further aspect of the present invention, an apparatus for detaching nil article from a member attached thereto includes means for supporting the attached article and member such that the member is in contact with a substantially rigid surface and the article is suspended away from the rigid surface. Means are provided for holding the member to the rigid surface. Means are provided for contacting the article, while the member is held to the rigid surface, to detach the article and the member. Means for gripping the member and means for moving the holding means and the gripping means to remove the gripped member from the substantially rigid surface are also provided.

In accordance with still a further aspect of the present invention, an apparatus for detaching articles from attached members is described. The articles and attached members are in the form of blanks. The apparatus includes a frame having first and second blank loading portions and a first and a second assembly for detaching articles from members of blanks loaded on the first and second blank loading portions, respectively. A loading station is provided for loading blanks onto the first and second blank loading portions. Means are provided for moving the frame such that one of the first and second blank loading portions is disposed beneath the first and second assemblies, respectively, and that one of the second anti first blank loading portions is disposed at the loading station.

BRIEF DESCRIPTION OF THE DRAWINGS

The present invention can be further understood with reference to the following description ill conjunction with the appended drawings, wherein like elements are provided with the same reference numerals. In the drawings:

FIG. 1A is a perspective view of a punching apparatus according to an embodiment of the present invention; FIG. 1B is a top plan view of a blank adapted to be punched by the punching apparatus of FIG. 1A; FIG. 1C is a side, partially cross-sectional view of the blank of FIG. 1B taken at section 1C—1C; FIG. 1D is a perspective view of an article separated from the blank of FIG. 1B; FIG. 1E is a top plan view of a member from which articles have been punched by the punching apparatus of FIG. 1A; and FIG. 1F is a side, partially cross-sectional view of the member of FIG. 1E taken at section 1F—1F;

FIG. 2 is a partially cross-sectional view of the punching apparatus of FIG. 1, taken at section 2—2;

FIG. 3 is a partially cross-sectional view of the punching apparatus of FIG. 1, taken at section 3—3;

FIGS. 4A and 4B are top plan and partially cross-sectional side views, respectively, of a grid or shuttle for a punching apparatus according to an embodiment of the present invention;

FIGS. 5A and 5B are partially cross-sectional top and bottom views, respectively, of a holder of a punching apparatus according to an embodiment of the present invention;

FIGS. 6A and 6B are partially cross-sectional side and top views, respectively, of a gripping or piercing pin assembly of a punching apparatus according to an embodiment of the present invention;

FIG. 7 is a side view of a piercing pin of a punching apparatus according to an embodiment of the present invention;

FIGS. 8A, 8B, 8C, 8D, 8E, 8F, and 8G are partially cross-sectional views of portions of a punching apparatus according to an embodiment of the present invention and show sequential steps in a method of punching according to an embodiment of the present invention; and FIG. 9A is a partial perspective view and FIG. 9B is a partial perspective view, rotated through ninety degrees, respectively, of means for loading a punching apparatus according to an embodiment of the present invention.

DETAILED DESCRIPTION OF THE PREFERRED EMBODIMENTS

FIGS. 1A, 2, and 3 show an apparatus 21 for punching blanks 23, shown in FIGS. 1B and 1C, of articles 25, shown in FIG. 1D, attached to one or more skeletal members 27 so as to detach the articles from the members. For purposes of this discussion, the articles 25 are groups of four COMBAT TM insect bait traps (25a), manufactured by The Clorox Company, which has offices in Oakland, Calif., which are intended to be packaged together. The member 27 is part of a thermoplastic web that also forms a bottom of the articles 25. The member 27 is defined by perforations 29 around the articles 25 and, upon detaching the articles from the member, the member is in the form of a grid having nine substantially square holes, as shown in FIGS. 1E and 1F. Bottoms of the individual bait traps 25a are also formed by the thermoplastic web and are separated from one another by perforations in the web that also form a skeleton between the individual bait traps, however, this portion of the skeleton can be left attached to the bait traps.

The apparatus 21 includes a main frame 31. A grid or shuttle 33, shown in FIGS. 4A and 4B, is slidably mounted on the frame 31, as shown in FIGS. 1A and 2-3, to move between a left and a right position. The grid 33 is moved between the left and the right position by any desired means 35 for moving the grid, as by a TRANS-AIR RODLESS CYLINDER, manufactured by Mosier, which has offices in Brookville, Ohio. A portion of the TRANS-AIR RODLESS CYLINDER is shown in cross-section in FIG. 2. The moving means 35 is connected to one longitudinal side 33a of the grid 33 by a flexible connector plate 37a, and the opposite longitudinal side 33b of the grid is connected by a second flexible connector plate 37b to guide means 39, such as a Thompson pillow block bearing, which ensures smooth back and forth movement of the grid. While moving means 35 such as the above-mentioned TRANS-AIR RODLESS CYLINDER device is preferred because there is no exposed rod needed for moving the grid 33, other moving means include known pneumatic, hydraulic, or rack and pinion apparatus, or an electric motor, and other guide means 39 include known bearing assemblies. The flexible connector plates 37a, 37b absorb stresses as the grid 33 is shifted back and forth by the moving means 35 and, as described further below, facilitate ease of movement of the grid 33.

The grid 33 includes a rigid portion having a surface 43 against which the member is held during punching of the article 25, the surface can be substantially the same shape as the member 27 to be detached from the article 25. The rigid portion defines an opening 43a that can be substantially the same shape as the article 25, thereby facilitating removing the article from the grid 33, i.e., by permitting the article to fall away after it has been detached from the member. The grid 33 can be in the form of two half-frames 45a, 45b that are connected to one another by a connecting portion 45c. The two half-frame grid 33 facilitates loading one half-frame 45a or 45b with a blank 23 for punching while a blank in the other half-frame 45b or 45a is punched. It is understood that a grid (not shown) may be provided that does not permit loading half of the grid while the other half is punched, and that grid configurations other than the multi-square grid 33 shown can be provided.

As shown in FIGS. 4A and 4B, the grid 33 can be provided with fingers 47 arranged around the surface 43 against which the member 27 is held. The fingers 47 facilitate detaching the articles 25 from the member 27 such that a small portion of the member extending between the bait traps 25a is detached from the bait traps, thereby forming a recessed area 27a. Depending upon the particular application to which the apparatus 21 is applied, the fingers 47 can be omitted from the grid.

As shown in FIG. 4A, the rigid portion includes crossing grid rails 49 defining part of the surface 43 and surrounding side rails 51 substantially defining the remainder of the surface. Raised portions 53 of the side rails 51 extend upward past the surface 43 to facilitate proper positioning of the blank 23 on the grid 33. Recesses 55 are formed in the raised portions 53 to receive holders 57, shown in detail in FIGS. 5A and 5B and described further below, which hold the member 27 against the surface 43. Bores 59 are formed in selected ones of the recesses 55 to receive portions of pin assemblies 61, shown in detail in FIGS. 6A, 6B, and 7 and described further below, for piercing and gripping and retaining the member 27. In the embodiments of the apparatus 21 shown in FIGS. 2 and 8A-8G, only a single one of the holders 57 and pin assemblies 61 is shown.

As an alternative to the above-described embodiment, holders can be provided for each recess 55, and a pin assembly can be received in the bore 59 in at least corner ones of the recesses. It should be understood, however, that not all of the holders 57 have (or need to) include a pin assembly 61. In practice, the pin assemblies and associated rocker arm assemblies are omitted from a substantial number of the holders 57.

As shown in FIG. 1A, after a blank 23 is loaded on the grid 33 at a central loading station 63 of the apparatus 21, the grid is moved by the moving means 35 to the left position beneath a left punch assembly 65 or to the right position beneath a right punch assembly 67, depending upon the initial location of the grid relative to the remainder of the apparatus. The left and right punch assemblies 65, 67 are substantially identical, except as otherwise noted herein. In the embodiment of the apparatus 21 shown in FIG. 1A, for example, the initial location of the grid 33 is in a right position, with the half-frame 45a located at the loading station 63 of the apparatus and the half-frame 45b located in the right position under the right punch assembly 67.

The half-frame 45a is loaded with a blank 23 at the loading station 63 and the grid 33 is then moved by the moving means 35 to the left position so that the loaded half-frame is in the left position for being punched by the left punch assembly 67. Means 69 for instructing the moving means 35 of the apparatus 21 to commence moving the grid 33 to the left or to the right include known operator-activated switch or pedal mechanisms, or known light sensors which detect when a blank 23 has been loaded on the grid and the operator's hands or other means for loading the blank, embodiments of which are described further below and shown in FIGS. 9A and 9B, have cleared moving parts of the apparatus.

Articles 25 are detached from attached members 27 beneath the left and right punch assemblies 65, 67. In the embodiment of the apparatus 21 shown in FIG. 1A, for example, a blank 23 on the half-frame 45b is positioned under the right punch assembly 67. The detached articles 25 are conveyed away from the apparatus 21 by a known conveyor apparatus 71 for packaging. When the articles 25 are detached from the member 27 by, for example, the right punch assembly 67, the member is gripped or pierced by the portions of the pin assemblies 61, which are movably mounted on each punch assembly, as will be described further below, and is removed by being raised away from the grid 33 to a first height by the right punch assembly.

At the first height, the member 27 and the gripping or piercing pin assemblies 61 clear the grid 33, the grid is moved by the moving means 35 to the left position, and the half-frame 45a, which has been loaded with a blank 23 at the loading station 63, is disposed beneath the left punch assembly 65 and the half-frame 45b is disposed at the loading station. After the half-frame 45b is removed from beneath the right punch assembly 67, means 73 strip the member 27 from the gripping or piercing pin assemblies 61. The stripping means 73 includes internal, pin-receiving bores 75 in holders 57 into each of which a piercing portion of a pin assembly 61 is retracted as the right assembly 67 is raised to a second height. When the member 27 is stripped from the gripping or piercing pin assemblies 61, the member falls freely because the half-frame 45b of the grid 33 has previously been moved from beneath the fight assembly 67. The member 27 falls to a conveyor 79 and is conveyed to a scrap bin, or the member falls to the conveyor 71 which conveys the member away from the apparatus 21, where it can be manually or automatically removed to scrap.

As shown with reference to FIGS. 1A and 2–3, the left and right assemblies 65, 67 are mounted relative to the frame 31 by one or more arms 83, which are attached to or form a part of the frame 31. In the embodiment shown in FIG. 2, the assemblies 65, 67 are mounted on arms 83 on both sides of the assembly to strengthen the mounting of the assemblies. As shown, however, in FIG. 1A, the assemblies 65, 67 can be mounted on single arms 83. For clarity, details of the holder 57, the pin assembly 61, the stripping means 73, and other elements of the apparatus 21 above the plate 89 are omitted from FIG. 1A.

The assemblies 65, 67 include means 85 for moving portions of the assemblies up and down to detach articles 25 from attached members 27. A suitable moving means 85 includes a LINEAR THRUSTER of the type manufactured by Ultramation, Inc., of Waco, Tex. Other moving means may be constructed using known pneumatic, hydraulic, rack and pinion, or electric motor reciprocating apparatus. The moving means 85 includes guide means 87 such as bearings in immovable portions of the assemblies 65, 67 and guide rods attached to movable portions of the assemblies.

When the moving portions of the assemblies 65, 67 are raised, the moving portions are first raised to a first height after which point the grid 33 is moved to the left or right, as required. The moving portions are then raised to a second height to facilitate stripping of the member 27 from the gripping or piercing pin assemblies 61 and allowing the member to fall unobstructed by the grid 33. The above-mentioned LINEAR THRUSTER accomplishes this two-height raising operation by means of piggyback cylinders which operate sequentially to raise the moving portions of the assemblies 65, 67 to the first and second heights. Other mechanisms for accomplishing the two height raising step are known, such as cam assemblies, or hydraulic or pneumatic assemblies including control systems for briefly stopping the upward motion of the moving portions of the punch assemblies 65, 67. The moving portions of the assemblies 65, 67 can be continuously raised by various known means and the movement of the grid 33 and the stripping of the member 27 from the pin assemblies 61 can accomplish the goal of stripping the member from the pin assemblies after movement of the grid by simply correctly timing the movement and stripping operations. The two step raising operation facilitates an effective, efficient, and uncomplicated grid movement and member stripping sequence.

The movable portions of the assemblies 65, 67 include a substantially horizontal plate 89 which is attached to a piston 91 for driving the plate up and down. Individual article-contacting plungers 93 are attached to the plate 89 at selected positions and move with the plate to contact the articles 25 and force them down, past the surface 43 on which the bottom of the blank 23 is loaded and into the openings 43a defined by the cross grid rails 49 and the side grid rails 51, thereby detaching the articles from the member 27. Where the articles 25 have surfaces that are contacted by the plungers 93 that are not uniformly flat, the bottom faces 93a of the plungers can be formed with extending portions 93b (shown in dashed lines in FIGS. 8A and 8B) that facilitate even contact with substantially all of the portion of the article desired to be detached from the member 27. For example, in separating an article 25 including four bait traps 25a that are raised above the member 27 connecting and surrounding the bait traps, the extending portions 93b are substantially in the form of a cross that fits between the raised bait traps and contact the portion of the member connecting those bait traps, as shown in FIG. 8B. The extending portions 93b call also be in the form of smaller plates, as shown in FIG. 8A. The extending portions 93b also cooperate with the fingers 47 to neatly shear off the member 27 from the articles 25 and any portion of the member 27 that is intended to remain connected to the individual bait traps 25a.

As shown in FIGS. 2 and 8A–8G, the holders 57 are movably mounted on the plate 89 through bores 95 formed in the plate. As shown in FIGS. 5A and 5B, a top end 97 of each of the holders 57 can be threaded and a bottom end 99 of each of the holders can be flared so that, when a holder is passed through a bore 95 and a nut 101 is fastened to the threaded top end of the holder, the holder has a limited range of movement relative to the plate 89. As shown in FIGS. 2 and 8A–8G, a compression spring 103 can be provided around the body 105 of each holder 57 to cause the flared bottom end 99 of the holder to tend to move away from the plate 89 so that the nut 101 is generally in contact with the top 105 of the plate.

A bottom face 107 of the bottom end 99 of the holder 57 can be provided with teeth 109 to facilitate holding the member 27 in place during a punching operation. When the spring 103 is extended, e.g., before or after the holder 57 is in contact with the member 27 as it rests on the surface 43, as shown, for example, in FIGS. 2, 8A, 8B, 8E, and 8G, the bottom face 107 and the teeth 109 at the bottom end 99 of the holder extend past the bottom of the plungers 93 so that, as the moving portions of the assemblies 65, 67 move downward, the teeth contact the member 27 before the plungers 93 contact the articles 25, thereby ensuring that the blank 23 is held in a proper position relative to the grid 33 during a punching operation. As the plate 89 and the plungers 93 move downward together and the teeth 109 on the bottom face 107 of the holder 57 contact the member 27, as shown in FIG. 8B, the holder is stopped in its downward movement and the spring 103 is compressed, such that the plate moves downward relative to the holder until the spring is fully compressed and the plungers are below the level of the surface 43 and in the openings 43a, as shown in FIGS. 8C and 8D.

Conversely, as the plate 89 is moved up from its lowest position, shown in FIG. 8E, the pressure on the spring 103 is released and the plate moves upward relative to the holder 57. To ensure that the bottom face 107 of the holder 57 extends to the full distance from the bottom 111 of the plate 89 and that the nut 101 on the top end 97 of the holder rests against the top 105 of the plate, an upwardly extending rod 113 is fixed relative to the top end of the holder. The rod 113 is fixed to a threaded flange 115 attached to the threaded top end 97 of the holder 57. As the plate 89 is raised, as shown in FIGS. 8E, 8F, and 8G, to the extent that the spring 103 does not fully expand and return to its relaxed position in which the bottom face 107 of the holder extends to the full distance from the bottom 111 of the plate and the nut 101 rests against the top 105 of the plate, the rod facilitates moving the holder to its full downward extension relative to the plate 89 by rising to contact a fixed plate 117, which can be attached to the arm 83 or some other stationary member.

The pin assembly 61, shown in FIGS. 6A, 6B, is movably mounted in the internal bore 75 in each holder 57. The pin assembly 61 includes a pin 119, details of which are shown in FIGS. 7, preferably is formed with a tip 121 having barbs 123. The pin 119 can include a threaded end 125 for replaceably attaching the pin to an internally threaded bore 127 in a pin body 129. The pin assembly 61 further includes a flared head 131 that is substantially larger than the internal bore 75 in the holder so that the extent to which the barbed tip 121 of the pin 119 extends past the bottom face 107 of the holder 57 is limited. It should be noted that the overall length of the pin assembly 61—from below the head 131 to the barbed tip 121—is longer than the overall length of the holder 57, with the result that the barbed tip of the pin extends past the bottom face 107 of the holder. The flared head 131 can be formed with a recess 133 for permitting the rod 113 to extend past the flared head and for facilitating proper alignment of the pin assembly 61 relative to the holder 57.

A fixed block or arm 133 is attached to the top 105 of the plate 89 adjacent the bores 95 and includes a vertical portion 135 extending upward a predetermined distance (which distance is a function of the length of the holder 57 and the length of the pin assembly 61) from the top of the plate and a horizontal portion 137 extending over the bore and, accordingly, over at least a portion of the head 131 of the pin assembly 61 movably mounted in the bore 75. As the plate 89 is moved downward, and the holder 57 contacts the member 27 and starts moving upward relative to the plate, as shown with reference to FIGS. 8B, the barbed tip 12 1 of the pin 119 of the pin assembly 61 is prevented from extending past the bottom face 107 of the holder at least because it is blocked by the member 27 and is not forced downward through the member. As will be explained further below, other means also tend to cause the barbed tip of the pin 119 of the pin assembly 61 to be retracted at least to a point even with the bottom face 107 of the holder 57 during the downward movement of the plate 89.

As the plate 89 continues its downward movement, the horizontal portion 137 of the fixed block 133 contacts the top or the head 131 of the pin assembly 61 and forces the barbed tip 121 through the member 27 and into the pin-receiving holes 59, as shown in FIGS. 8C and 8D. At substantially the same time as the barbed tip 121 of the pin 119 of the pin assembly 61 is forced through the member 27, the plungers 93 contact the articles 25 and move past the surface 43 and detach the articles from the member. The extension length of the barbed tip 121 can be adjusted, as with an adjusting screw, so that the tip is forced through the member 27 after or before the plungers contact the articles 25 and move past the surface 43 and detach the articles from the member.

When the upward and downward moving means 85 have moved the moving portions of the left or right assemblies to a lowermost point, the moving means begins to raise the moving portions, as shown in FIG. 8E. As the plate 89 is raised, the plungers 93 follow and are moved above the grid 33. The spring 103 expands to force the flared bottom end 99 of the holder 57 away from the bottom 111 of the plate 89. The member 27 is retained, i.e, by being gripped or pierced, on the barbed tip 121 of the pin 119 of the pin assembly 61. While the system is described in conjunction with an embodiment incorporating a pin assembly 61 that includes a barbed tip 121 of a pin 119 for piercing the member 27 so that the piercing of the member causes it to be gripped and retained, it is understood that other means for gripping and retaining the member can alternatively be used, such as finger or vacuum devices or adhesives which cause the member to be gripped and retained.

The top end 97 of the holder 57 contacts the underside 139 of the head 131 of the pin assembly 61 and causes the pin to be raised with the holder. When the plungers 93, the holder 57, and the pin assembly 61 with the retained member 27 have cleared the grid 33, the upward and downward moving means 85 can momentarily stops raising the moving portions of the assembly 65 or 67, and the moving means 35 moves the grid to the left or the right, as required, for another loading operation at the loading station 63 and a punching operation at the other assembly 67 or 65.

After the moving means 35 moves the grid or shuttle 33 to the left or to the right, the upward and downward moving means 85 continues to move the moving portions or the assembly 65 or 67 upward. To release the member 27 retained on the barbed tip 121, a rocker arm 141 can be mounted on the vertical portion 135 of the fixed block 133 and a release member 143, such as a vertically descending rod or plate, is fixed to a stationary member, such as an arm 83 for contacting an end 141a of the rocker arm. As the plate 89 is raised and the vertical portion 135 of the fixed block 133 is raised with the plate, the end 141a of the rocker arm 141 contacts the release member 143 and the rocker arm is pivoted so that an opposite end 141b of the rocker arm is raised. The opposite end 141b of the rocker arm 141 contacts the underside 139 of the head 131 of the pin assembly 61 and causes the barbed tip 121 of the pin 119 of the pin assembly 61 to rise relative to the plate 89. When the moving portions of the assemblies 65 and 67 are moving downward, and the end 141a of the rocker arm 141 is not in contact with the release member 143, the end 141b of the rocker arm docs not ordinarily prevent the pin assembly 61 from moving downward relative to the holder 57, except to the extent that there is sufficient friction in the connection of the rocker arm to the fixed member 133 to prevent the mass of the pin assembly from pivoting the rocker arm. Thus, the rocker arm 141 facilitates maintaining the barbed tip 121 of the pin 119 of the pin assembly 61 retracted inside the bore 75 in the holder 57.

As shown in FIGS. 8F and 8G, to ensure that the barbed tip 121 is withdrawn into the internal bore 75 of the holder 57, at substantially the same time as the rocker arm 141 is pivoted, the rod 113 contacts the plate 117 and causes the bottom face 107 of the holder to extend as far from the bottom 111 of the plate 89 as possible, i.e., the holder 57 is moved downward relative to the plate 89 and the pill assembly 61 is moved upwardly relative to the plate. When the barbed tip 121 is retracted inside the internal bore 75 of the holder 57, the member 27 is released from the barbed tip and falls, unobstructed by the grid 33, to a conveyor 71 or 79 to be conveyed away from the apparatus 21. A stronger spring 103 can be employed to cause the holder 57 to be moved downward relative to the plate 89 to retract the barbed tip 121 of the pin 119 of the pin assembly 61 into the internal bore 75 of the holder, and thereby remove the need for the rod 113 and plate 117 to force the holder downward. However, the rod 113 and plate 117 assembly compensates for wear to the spring 103 through repeated cycling and further to ensure that an overly strong spring does not inadvertently force the holder 57 down relative to the plate 89 and the pin assembly 61 and cause the member 27 to be released from the barbed tip 121 of the pin 119 prior to movement of the grid 33. As shown, for example, in FIG. 2, the plate 117 and the release member 143 can form a single structure extending from the arm 83.

As shown in FIG. 2, the grid 33 can be suspended by the flexible connector plates 37a, 37b a small distance above a rigid portion 145 of the frame 31 to minimize friction during the movement of the grid by the moving means 35. In practice, the distance is selected such that, as or shortly after the plungers 93 and the bottom faces 107 of the holders 57 contact the articles 25 and the member 27, respectively, the flexible members 37a, 37b elastically yield sufficiently such that the grid 33 is rigidly supported against the rigid portion 145 of the frame 31. In this manner, advantages of ease of movement of the grid 33 are combined with a rigidity of the grid desired for performing a punching operation.

The apparatus 21 is loaded with blanks 23 by an operator manually or, as shown in FIGS. 9A and 9B, with a loading apparatus 147. In the illustrated embodiment, the loading apparatus 147 has a plurality of suction cups 149 (FIG. 9B) that create sufficient vacuum to hold the blank 23 to the suction cups. The vacuum may be created by suction means such as for example, a venturi generator or other known vacuum devices. The suction means can be activated by a switch or trigger on a set of hand grips 151 on the loading apparatus 147 for lift blanks 23 from a pick-up point such as a conveyor 153 or a stack of blanks. The operator moves the loading apparatus 147 from the pick-up point to a position above the loading station 63 by activating a means for mechanically moving the loading apparatus such as an electric motor, and deactivates the suction means to load the half-frame 45a or 45b. The loading apparatus 147 can be moved in any known fashion to facilitate ease of movement of the loading apparatus, such as by being moved on wheels along a track or by being moved with cables or chains which suspend the loading apparatus from a ceiling track. The loading apparatus 147 is moved from the pick-up point to the loading station 63 by being turned through 180° (shown in FIG. 9A) or without being turned. In practice, the loading apparatus 147 is vertically movable to facilitate picking up and loading blanks 23.

In a method for detaching an article 25 from a member 27, the attached article and member are supported on the grid 33 such that the member is in contact with a substantially rigid surface 43 and the article is suspended away from the rigid surface over the opening 43a. The holder 57 holds the member to the rigid surface 43. The article 25 is contacted by a descending plunger 93 while the member 27 is held to the rigid surface 43 by the holder 57 to detach the article and the member. The member 27 is gripped or pierced or retained by the barbed tip 121 of the pin 119 of the pin assembly 61. The gripped or pierced or retained member 27 is removed from the substantially rigid surface 43 as the moving portions of the assemblies are raised.

The gripped member 27 is released from the barbed tip 121 of the pin 119 of the pin assembly 61 after being removed from the substantially rigid surface. The member 27 is released by retracting the barbed tip 121 of the pin 119 of the pin assembly 61 into the holder 57. The holder 57 and the contacting plunger 93 can be moved together to hold the member 27 and contact the article 25, respectively.

In the illustrated embodiment, the member 27 is held by the holder 57 before the article 25 is contacted by the plunger 93. The member 27 can be gripped or pierced or retained by the barbed tip 121 of the pin 119 of the pin assembly 61 prior to, concurrently with, or after the plunger 93 contacts the article 25. After the gripped or pierced or retained member 27 is removed from the substantially rigid surface 43, the substantially rigid surface 43 is moved by moving means 35 so that, when the member is released, the released member falls without being obstructed by the substantially rigid surface. The released member 27 can then conveyed, as by a conveyor 71 or 79, to a site remote from the apparatus 21, such as a scrap bin.

The foregoing has described the principles, preferred embodiments and modes or operation of the present invention. However, the invention should not be construed as limited to the particular embodiments discussed. For example, it should be understood that the apparatus 21 has general application in detaching an article or articles, generally, from an attached member or members, whether the articles and members are defined by perforations or not, and regardless of the shape of the articles and the members. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. An apparatus for detaching an article from a member attached thereto, comprising:
    means for supporting the article and the member attached thereto, the supporting means including a substantially rigid surface, such that the member is in contact with the rigid surface and the article is suspended away from the rigid surface;
    means for holding the member to the rigid surface;
    means for contacting the article, while the member is held to the rigid surface by the holding means, to detach the article from the member;
    means for gripping the member movably mounted within the holding means and including a gripping portion extendable to the exterior of the holding means to grip the member;
    means for moving the gripping means and the holding means away from the supporting means to remove the gripped member from the rigid surface; and
    releasing means, associated with the holding means and the gripping means, for causing the gripping means to release the gripped member from the gripping means by causing the gripping portion of the gripping means to be retracted into the interior of the holding means, after the moving means moves the gripping means away from the rigid surface.

2. The apparatus of claim 1, wherein the gripping portion includes means for piercing the member.

3. The apparatus of claim 1, wherein the moving means further moves the holding means and the contacting means, together, relative to the supporting means to hold the member and contact the article, respectively.

4. The apparatus of claim 3, wherein gripping portion includes piercing means that grips the member by piercing the member.

5. The apparatus of claim 3, wherein the moving means moves the gripping means relative to the supporting means, together with the holding means and the contacting means, the gripping means being arranged relative to the contacting means such that, when the moving means moves the gripping means and the contacting means, the gripping means grips the member before the contacting means contacts the article.

6. The apparatus of claim 3, wherein the moving means moves the gripping means relative to the supporting means, together with the holding means and the contacting means, the gripping means being arranged relative to the contacting means such that, when the moving means moves the gripping means and the contacting means, the gripping means grips the member as the contacting means contacts the article.

7. The apparatus of claim 3, wherein the moving means moves the gripping means relative to the supporting means, together with the holding means and the contacting means, the gripping means being arranged relative to the contacting means such that, when the moving means moves the gripping means and the contacting means, the gripping means grips the member after the contacting means contacts the article.

8. The apparatus of claim 1, wherein the gripping means and the releasing means are disposed vertically above the rigid surface, the apparatus further comprising means for horizontally moving the rigid surface after the moving means moves the gripping means to remove a gripped, detached member from the rigid surface so that, when the releasing means causes the gripping means to release the gripped, detached member, the released member falls to a point below the rigid surface without being obstructed by the rigid surface.

9. The apparatus of claim 8, further comprising means for conveying the released member to a remote site after it has fallen to the point below the rigid surface.

10. The apparatus of claim 1, further comprising means for conveying the released member to a remote site.

11. The apparatus of claim 2, wherein the piercing means includes a pin having barbs formed thereon.

12. The apparatus of claim 4, wherein the piercing means includes a pin having barbs formed thereon.

* * * * *